US009470883B2

(12) United States Patent
Kalkbrenner et al.

(10) Patent No.: US 9,470,883 B2
(45) Date of Patent: Oct. 18, 2016

(54) HIGH-RESOLUTION SCANNING MICROSCOPY

(71) Applicant: Carl Zeiss Microscopy GmbH, Jena (DE)

(72) Inventors: Thomas Kalkbrenner, Jena (DE); Ingo Kleppe, Jena (DE); Helmut Lippert, Jena (DE); Ralf Netz, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 104 days.

(21) Appl. No.: 14/490,806

(22) Filed: Sep. 19, 2014

(65) Prior Publication Data

US 2015/0185454 A1    Jul. 2, 2015

Related U.S. Application Data

(60) Provisional application No. 62/025,684, filed on Jul. 17, 2014.

(30) Foreign Application Priority Data

Sep. 19, 2013    (DE) .......................... 10 2013 015 931

(51) Int. Cl.
*G02B 26/00* (2006.01)
*G02B 21/00* (2006.01)
(Continued)

(52) U.S. Cl.
CPC .............. *G02B 21/008* (2013.01); *G01J 9/02* (2013.01); *G02B 6/06* (2013.01); *G02B 21/0032* (2013.01);
(Continued)

(58) Field of Classification Search
CPC ............ G01B 21/008; G02B 26/0833; G02B 26/0816; G02B 21/0072; G02B 21/0084; G02B 21/025; G02B 21/0032; G02B 6/06; G02B 21/0076; G02B 27/58; G01J 9/02
See application file for complete search history.

(56) References Cited

U.S. PATENT DOCUMENTS

| 6,545,790 B2 | 4/2003 | Gerchberg |
| 2011/0032586 A1 | 2/2011 | Gerchberg et al. |
| 2015/0077843 A1* | 3/2015 | Huhse ................ G02B 21/0032 |
| | | 359/380 |

FOREIGN PATENT DOCUMENTS

| DE | 10 2006 021 317 B3 | 10/2007 |
| EP | 1 157 297 B1 | 11/2002 |

(Continued)

OTHER PUBLICATIONS

Muller, Claus B., et al., "Image Scanning Microscopy", Physical Review Letters 2010; 104(19)1198101-1-198101-4.
(Continued)

*Primary Examiner* — Tony Ko
(74) *Attorney, Agent, or Firm* — Duane Morris LLP

(57) ABSTRACT

A microscope for high resolution scanning microscopy of a sample, having:
an illumination device for the purpose of illuminating the sample, an imaging device for the purpose of scanning at least one point or linear spot over the sample and of imaging the point or linear spot into a diffraction-limited, static single image below am imaging scale in a detection plane. A detector device for detecting the single image in the detection plane for various scan positions, with a spatial resolution which, taking into account the imaging scale in at least one dimension/measurement, is at least twice as high as a full width at half maximum of the diffraction-limited single image. The amplitude and/or phase of a wavefront influenced by the sample is detected with spatial resolution by means for wavefront detection, and wherein the influence of the sample on the phase is determined by means of a wavefront sensor.

50 Claims, 12 Drawing Sheets

(51) Int. Cl.
- *G02B 6/06* (2006.01)
- *G01J 9/02* (2006.01)
- *G02B 21/02* (2006.01)
- *G02B 26/08* (2006.01)
- *G02B 27/58* (2006.01)

(52) U.S. Cl.
CPC ....... *G02B 21/0072* (2013.01); *G02B 21/0084* (2013.01); *G02B 21/025* (2013.01); *G02B 26/0816* (2013.01); *G02B 26/0833* (2013.01); *G02B 21/0076* (2013.01); *G02B 27/58* (2013.01)

(56) References Cited

FOREIGN PATENT DOCUMENTS

| | | |
|---|---|---|
| EP | 2 317 362 A1 | 5/2011 |
| WO | WO 2006/127692 A2 | 11/2006 |

OTHER PUBLICATIONS

Gong, Wei, et al., "Improved spatial resolution in fluorescence focal modulation microscopy", Optics Letters 2009; 34(22) 3508-3510.

Heintzmann, R., et al., "Laterally Modulated Excitation Microscopy: Improvement of resolution by using a diffraction grating"; In Proceedings of SPIE 1998; 3568:185-196.

Shao, Lin, et al.; "Super-resolution 3D microscopy of live whole cells using structured illumination"; Nature Methods 2011; 8(12):1044-1046.

Littleton, B., et al; Coherent super-resolution microscopy via laterally structured illumination; Micron 2007; 38:150-157.

Karadaglic, D., et al.; "Image formation in structured illumination wide-field fluorescence microscope"; Micron 2008; 39:808-818.

Chowdhury; "Structured oblique illumination microscopy for enhanced resolution imaging of non-fluorescent, coherently scattering samples";Biomed. Opt. Exp. 2012;3(8):1841-1854.

Bertero, M., et al.; "Super-resolution in confocal scanning microscopy"; Inverse Problems 1987; 3:195-212.

Cox, I.J., et al.; "Super-resolution by confocal fluorescent microscopy"; Optik 1982; 60(4):391-396.

Sheppard, C.J.R.; "Super-resolution in Confocal Imaging"; Optik 1988; 80 (2):53-54.

Grochmalicki, J., et al.; "Superresolving masks for incoherent scanning microscopy"; J. Opt. Soc. Am. A 1993; 10(5):1074-1077.

Hamilton, D.K., et al.; "A confocal interference microscope"; Optica Acta 1982; 29(12)1573-1577.

Gerchberg, R.W., et al.; "A Practical Algorithm for the Determination of Phase from Image and Diffraction Plane Pictures"; Optik 1972; 35(2):237-246.

Foreman, M.R., et al.; "Phase-retrieved pupil function and coherent transfer function in confocal microscopy"; Journal of Microscopy 2013; 251(1):99-107.

Becker, W., et al.; "Advanced time-correlated single photon counting techniques"; Springer 2005; pp. 61-212.

http://de.wikipedia.org/wiki/Hartmann-Schack-Sensor.

Yang, C., et al.; "Quantitative surface normal measurement by a wavefront camera"; Optics Letter 2012; 37(2):199-201.

Mertz, J., et al.; "Quantitative phase imaging using a partitioned detection aperture" Optics Letter 2012; 37(19):4062-4064.

Iglesias, Ignacio; "Pyramid phase microscopy"; Optics Letters 2011; 36(18):3636-3638.

Bon, P., et al.; "Quadriwave lateral shearing interferometry for quantitative phase microscopy of living cells"; Optics Express 2009; 17(15):13080-13094.

Anand, A., et al.; "Quantitative phase-contrast imaging with compact digital holographic microscope employing Lloyd's mirror"; Optics Letter 2012; 37(24):5127-5129.

Popescu, Gabriel; "Quantitative Phase Imaging of Nanoscale Cell Structure and Dynamics"; Methods in Cell Biology 2008; 90:87-115.

Zhao, C., et al.; "Confocal simultaneous phase-shifting interferometry"; Applied Optics 2010; 50(5):655-661.

PCT Notification of Transmittal of Translation of the International Preliminary Report on Patentability.

\* cited by examiner

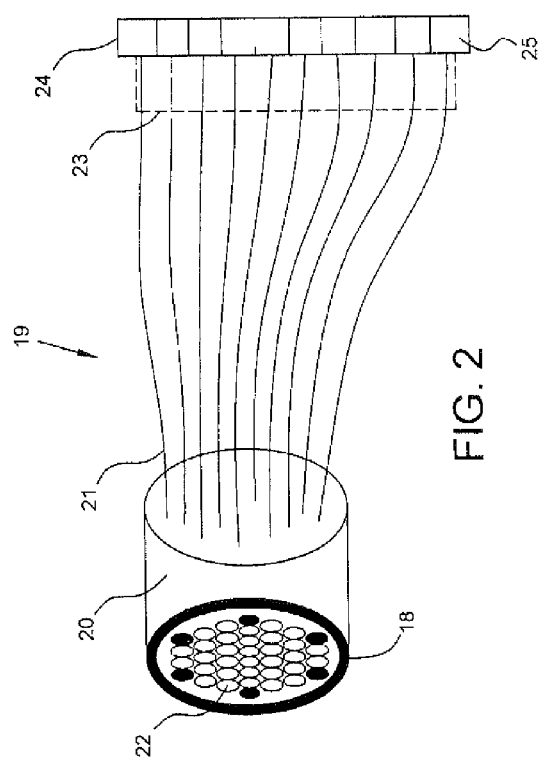
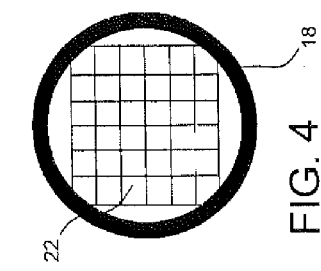
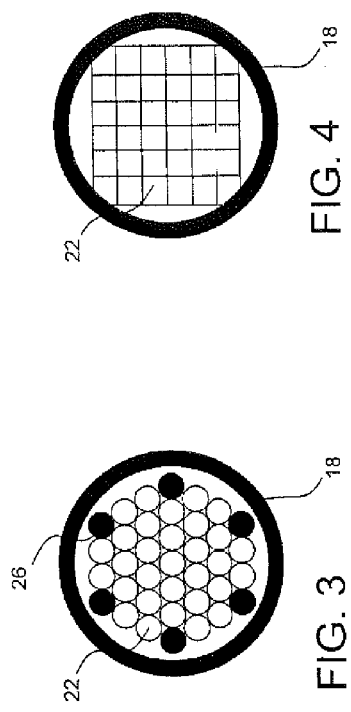

HIGH-RESOLUTION SCANNING MICROSCOPY

RELATED APPLICATIONS

The present application is a nonprovisional application of provisional Patent Application No. 62/025,684 filed on Jul. 17, 2014 and claims priority benefit of German Application No. DE 10 2013 015 931.8 filed on Sep. 19, 2013, the contents of each are incorporated by reference in their entirety.

FIELD OF THE INVENTION

The invention relates to a microscope for high resolution scanning microscopy of a sample. The microscope has an illumination device for the purpose of illuminating the sample, an imaging device for the purpose of scanning a point or linear spot across the sample and of imaging the point or linear spot into a diffraction-limited, static single image, with an imaging scale in a detection plane, a detector device for the purpose of detecting the single image in the detection plane for various scan positions with a location accuracy (or spatial resolution) that, taking into account the imaging scale, is at least twice as high as a full width at half maximum of the diffraction-limited single image. The microscope also has an evaluation device for the purpose of evaluating a diffraction structure of the single image for the scan positions, using data from the detector device, and for the purpose of generating an image of the sample that has a resolution which is enhanced beyond the diffraction limit. The invention further relates to a method for high resolution scanning microscopy of a sample. The method includes steps for illuminating a sample, and imaging a point or linear spot guided over the sample in a scanning manner into a single image. The spot is imaged into the single image, with an imaging scale, and diffraction-limited, while the single image is static in a detection plane. The single image is detected for various scan positions with a location accuracy that is at least twice as high, taking into account the imaging scale, as a full width at half maximum of the diffraction-limited single image, so that a diffraction structure of the single image is detected. For each scan position, the diffraction structure of the single image is evaluated and an image of the sample is generated which has a resolution that is enhanced beyond the diffraction limit.

BACKGROUND OF THE INVENTION

Such a microscope and/or microscopy method is known from, by way of example, the publication C. Müller and J. Enderlein, Physical Review Letters, 104, 198101 (2010), or EP 2317362 A1, which also lists further aspects of the prior art.

This approach achieves an increase in location accuracy by imaging a spot on a detection plane in a diffraction-limited manner. The diffraction-limited imaging process images a point spot as an Airy disk. This diffraction spot is detected in the detection plane in such a manner that its structure can be resolved. Consequently, an oversampling is realized at the detector with respect to the imaging power of the microscope. The shape of the Airy disk is resolved in the imaging of a point spot. With a suitable evaluation of the diffraction structure—which is detailed in the documents named (the disclosure of which in this regard is hereby cited in its entirety in this application) an increase in resolution by a factor of 2 beyond the diffraction limit is achieved.

However, it is unavoidable in this case of the detector, that it is necessary to capture a single image with multiple times more image information for each point on the sample that is scanned in this way, compared to a conventional laser scanning microscope (shortened to "LSM" below). If the structure of the single image of the spot is detected, by way of example, with 16 pixels, not only is the volume of data per spot 16-times higher, but also a single pixel contains, on average, only $1/16$ of the radiation intensity which would fall on the detector of an LSM in a conventional pinhole detection. Because the radiation intensity is, of course, not evenly distributed across the structure of the single image—for example the Airy disk—in reality, even less—and particularly significantly less—radiation intensity arrives at the edge of this structure than the average value of $1/n$ for n pixels.

Consequently, the problem exists of being able to detect quantities of radiation at the detector at high resolution. Conventional CCD arrays that are typically used in microscopy do not achieve sufficient signal-to-noise ratios, such that even a prolongation of the duration for the image capture, which would already be disadvantageous in application per se, would not provide further assistance. APD arrays also suffer from excessively high dark noise, such that a prolongation of the measurement duration would result here as well in an insufficient signal/noise ratio. The same is true for CMOS detectors, which are also disadvantageous with respect to the size of the detector element because the diffraction-limited single image of the spot would fall on too few pixels. PMT arrays suffer from similar constructed space problems. The pixels in this case are likewise too large. The constructed space problems are particularly a result of the fact that an implementation of a microscope for high resolution can only be realized, as far as the effort required for development and the distribution of the device are concerned, if it is possible to integrate the same into existing LSM constructions. However, specific sizes of the single images are pre-specified in this case. As a result, a detector with a larger surface area could only be installed if a lens were additionally configured that would enlarge the image once more to a significant degree—i.e. several orders of magnitude. Such a lens is very complicated to design in cases where one wishes to obtain the diffraction-limited structure without further imaging errors.

Other methods are known in the prior art for high resolution which avoid the problems listed above that occur during detection. By way of example, a method is mentioned in EP 1157297 B1, whereby non-linear processes are exploited using structured illumination. A structured illumination is positioned over the sample in multiple rotary and point positions, and the sample is imaged on a wide-field detector in these different states in which the limitations listed above are not present.

A method which also achieves high resolution without the detector limitations listed above (i.e. a resolution of a sample image beyond the diffraction limit) is known from WO 2006127692 and DE 102006021317. This method, abbreviated as PALM, uses a marking substance which can be activated by means of an optical excitation signal. Only in the activated state can the marking substance be stimulated to release certain fluorescence radiation by means of excitation light. Molecules which are not activated do not emit fluorescent radiation, even after illumination with excitation light. The excitation light therefore switches the activation substance into a state in which it can be stimulated to fluoresce. Therefore, this is generally termed a switching signal. The same is then applied in such a manner that at least a certain fraction of the activated marking molecules are spaced apart from neighboring similarly-activated marking molecules in such a manner that the activated marking molecules are separated on the scale of the optical resolution of the microscope, or may be separated subsequently. This is termed isolation of the activated molecules. It is simple, in the case of these isolated molecules, to determine the center of their radiation distribution which is limited by the resolution, and therefore to calculate the location of the molecules with a higher precision than the optical imaging actually allows. To image the entire sample, the PALM method takes advantage of the fact that the probability of a marking molecule being activated by the switching signal at a given intensity of the switching signal is the same for all of the marking molecules. The intensity of the switching signal is therefore applied in such a manner that the desired isolation results. This method step is repeated until the greatest possible number of marking molecules have been excited [at least] one time within a fraction that has been excited to fluorescence.

SUMMARY OF THE INVENTION

In the invention, the spot sampled on the sample is imaged statically in a detection plane. The radiation from the detection plane is then redistributed in a non-imaging manner and directed to the detector array. The term "non-imaging" in this case refers to the single image present in the detection plane. However, individual regions of the area of this single image may, of course be imaged within the laws of optics. As such, imaging lenses may naturally be placed between the detector array and the redistribution element. The single image in the detection plane, however, is not preserved as such in the redistribution.

The term "diffraction-limited" should not be restricted here to the diffraction limit according to Abbe's Theory. Rather, it should also encompass situations in which the configuration fails to reach the theoretical maximum by an error of 20% due to actual insufficiencies or limitations. In this case as well, the single image has a structure which is termed a diffraction structure in this context. It is oversampled.

This principle makes it possible to use a detector array which does not match the single image in size. The detector array is advantageously larger or smaller in one dimension than the single image being detected. The concept of the different geometric configuration includes both a different elongation of the detector array and an arrangement with a different aspect ratio with respect to the height and width of the elongation of the single image in the detection plane. The pixels of the detector array may, in addition, be too large for the required resolution. It is also allowable, at this point, for the outline of the pixel arrangement of the detector array to be fundamentally different from the outline that the single image has in the detection plane. In any event, the detector array according to the invention has a different size than the single image in the detection plane. The redistribution in the method and/or the redistribution element in the microscope make it possible to select a detector array without needing to take into account the dimensional limitations and pixel size limitations that arise as a result of the single image and its size. In particular, it is possible to use a detector row as a detector array.

In the conventional LSM manner, the image of the sample is created from a multiple single images by scanning the sample with the spot, whereby each of the single images is associated with another sampling position—, i.e. another scan position.

The concept of the invention may also be implemented at the same time for multiple spots in a parallel manner, as is known for laser scanning microscopy. In this case, multiple spots are sampled on the sample in a scanning manner, and the single images of the multiple spots lie next to one another statically in the detection plane. They are then either redistributed by a shared redistribution element that is accordingly large with respect to surface area, and/or by multiple individual redistribution elements, and then relayed to an accordingly large single detector array and/or to multiple individual detector arrays.

The subsequent description focuses, by way of example, on the sampling process using an individual point spot. However, this should not be understood to be a limitation, and the described features and principles apply in the same manner to the parallel sampling of multiple point spots as to the use of a linear spot. The latter case is of course only diffraction-limited in the direction perpendicular to the elongation of the line, so that the features of this description with respect to this aspect only apply in one direction (perpendicular to the elongation of the line).

With the procedure according to the invention, the LSM method may be carried out at a satisfactory speed and with acceptable complexity of the apparatus.

The invention opens up a wide field of applications for a high resolution microscopy principle that has not existed to date.

One possibility for effecting the redistribution and/or the redistribution element comprises using a bundle of optical fibers. These may preferably be designed as multi-mode optical fibers. The bundle has an input that is arranged in the detection plane and that has an adequate dimensioning for the dimensions of the diffraction-limited single image in the detection plane. In contrast, at the output, the optical fibers are arranged in the geometric arrangement that is pre-specified by the detector array and that differs from the input. The output ends of the optical fibers in this case may be guided directly to the pixels of the detector array. It is particularly advantageous if the output of the bundle is gathered in a plug that may be easily plugged into a detector row—for example, an APD or PMT row.

It is important for the understanding of the invention to differentiate between pixels of the detector array and the image pixels with which the single image is resolved in the detection plane. Each image pixel is generally precisely functionally assigned to one pixel of the detector array. However, the two are different with respect to their arrangement. Among other things, it is a characterizing feature of the invention that, in the detection plane, the radiation is captured on image pixels, which produce an oversampling of the single image with respect to their size and arrangement. In this manner, the structure of the single image is resolved that is a diffraction structure due to the diffraction-limited production of the single image. The redistribution element has an input side on which this image pixel is provided. The input side lies in the detection plane. The redistribution element directs the radiation on each image pixel to one of the pixels of the detector array. The assignment of image pixels to pixels of the detector array does not preserve the image structure, which is why the redistribution is non-imaging with respect to the single image. The invention could therefore also be characterized in that, in a generic microscope, the detector device has a non-imaging redistribution element which has input sides in the detection plane in which the radiation is captured by means of image pixels. The redistribution element, further, has an output side via which the radiation captured at the image pixels is relayed to pixels of a detector array, whereby the radiation is redistributed from the input side to the output side in a non-imaging manner with respect to the single image. In an analogous manner, the method according to the invention could be characterized in that, in a generic method, the radiation is captured in the detection plane by means of image pixels that are redistributed to pixels of the detector array in a non-imaging manner with respect to the single image. The detector array differs from the arrangement and/or the size of the image pixels in the detection plane with respect to the arrangement and/or size of its pixels. In addition, the image pixels in the detection plane are provided by the redistribution element in such a way that, with respect to the diffraction limit, the diffraction structure of the single image is oversampled.

In highly-sensitive detector arrays, it is known that adjacent pixels demonstrate interference when radiation intensities are high as a result of crosstalk. To prevent this, an implementation is preferred where the optical fibers are guided from the input to the output in such a way that optical fibers that are adjacent at the output are also adjacent at the input. Because the diffraction-limited single image does not demonstrate any large jumps in radiation intensity changes, such a configuration of the redistribution element automatically ensures that adjacent pixels of the detector array receive the least possible differences in radiation intensity, which minimizes crosstalk.

In place of a redistribution based on optical fibers, it is also possible to equip the redistribution element with a mirror that has mirror elements with different inclinations. Such a mirror may be designed, by way of example, as a multi-facet mirror, a DMD, or adaptive mirror, whereby in the latter two variants a corresponding adjustment and/or control process ensures the inclination of the mirror elements. The mirror elements direct the radiation from the detection plane to the pixels of the detector array, the geometrical design of which is different from the mirror elements.

The mirror elements depict, as do the optical fiber ends at the input of the optical fiber bundle, the image pixels with respect to the resolution of the diffraction structure of the single image. Their size is decisive for the oversampling. The pixel size of the detector array is not (is no longer). As a result, a group of multiple single detectors is understood in this case to be a detector array, because they always have a different arrangement (i.e. a larger arrangement) than the image pixels in the detection plane.

In LSM, different lenses are used depending on the desired resolution. Changing a lens changes the dimensions of a single image in the detection plane. For this reason, it is preferred that a zoom lens is arranged in front of the detection plane in the direction of imaging for the purpose of matching the size of the single image to the size of the detector device. Such a zoom lens varies the size of the single image in a percent range which is significantly smaller than 100%, and is therefore much simpler to implement than a multiplication of the size of the single image, which was described as disadvantageous above.

The illumination of the sample is preferably carried out as in a typical LSM process, likewise scanning—although this is not absolutely necessary. However, the maximum increase in resolution is achieved in this way. If the sample is illuminated in a scanning manner, it is advantageous that the illumination device and the imaging device have a shared scanning device which guides an illumination spot across the sample, and simultaneously descans the spot at which the sample is imaged, which is coincident with the illumination spot, with respect to the detector, such that the single image is static in the detection plane. In such a construction, the zoom lens can be placed in the shared part of the illumination device and imaging device. The lens then makes it possible to not only match the single image to the size of the detector in the detection plane, but also it additionally enables the available illumination radiation to be coupled into the objective pupil completely, without edge loss, whereby said objective pupil can vary together with the selection of the lens.

A radiation intensity-dependent crosstalk between adjacent pixels of the detector array can, as already explained, be reduced during the redistribution by means of an optical fiber bundle by a suitable arrangement of the optical fibers in the bundle.

In addition or alternatively thereto, it is also possible to carry out a calibration. For this purpose, each optical fiber receives radiation one after the other, and the interference signal is detected in neighboring pixels. In this manner, a calibration matrix is established, by means of which a radiation intensity-dependent crosstalk between adjacent pixels is corrected in the later microscopy of the sample.

The resolution of the diffraction structure of the single image also makes it possible to determine a direction of movement of the spot, whereby the sample is moved along the same during the scanning. This direction of movement is known in principle from the mechanism of the scanner (for example, a scanning mirror or a moving sample table), but nevertheless there are residual inaccuracies in this case arising from the mechanism. These can be eliminated by evaluating signals of individual pixels of the detector array by means of cross-correlation. In this case, one takes advantage of the fact that, relative to [sic] adjacent image pixels in the sample overlap to a certain degree due to the diffraction-limited imaging of the spot, whereas their centers lie adjacent to each other. If the signals of such image pixels are subjected to a cross-correlation, it is possible to reduce and/or to completely eliminate a residual inaccuracy which persists as a result of unavoidable tolerances of the scanning mechanism.

In addition to the increased resolution, it is possible to detect a chronological change in the fluorescence in the detection volume comprised by the spot via the spatial and chronological correlation of the signals from a series of measurements of the individual detector elements (to which the image pixels in the detection plane are functionally assigned). By way of example, diffusion coefficients can be determined from a chronological correlation, as in fluorescence correlation spectroscopy, and oriented diffusion and diffusion barriers can be visualized by incorporating the spatial correlation between image pixels. Movement processes of the fluorescence molecules are also of great interest for tracking applications as well, because the illumination spot in this case should follow the movement of the fluorescent molecules. The arrangement described here makes it possible to determine the movement direction with high precision, even during the bleaching time of a pixel. For this reason, it is preferred, as one implementation, that changes in the sample are detected by means of determining and evaluating a chronological change in the diffraction-limited single image for the point or linear spot which is stationary in the sample.

The procedure according to the invention also makes it possible to modify the illumination distribution in scanning illumination processes, for example by means of a phase filter. The method as described in Gong et al., Opt. Let., 34, 3508 (2009) can be realized very easily as a result.

Where a method is described herein, a control device implements this method in the operation of the microscope.

It should be understood that the features named above and explained further below can be used not only in the given combinations, but also in other combinations or alone without departing from the scope of the present invention.

BRIEF DESCRIPTION OF THE DRAWINGS

The invention is described in greater detail below with reference to the attached drawings, which also disclose essential features of the invention, wherein:

FIG. 2 shows an enlarged illustration of a detector device of the microscope in FIG. 1;

FIG. 3 and FIG. 4 show top views of possible embodiments of the detector device 19 in a detection plane;

DETAILED DESCRIPTION OF THE DRAWINGS

Figure 1:
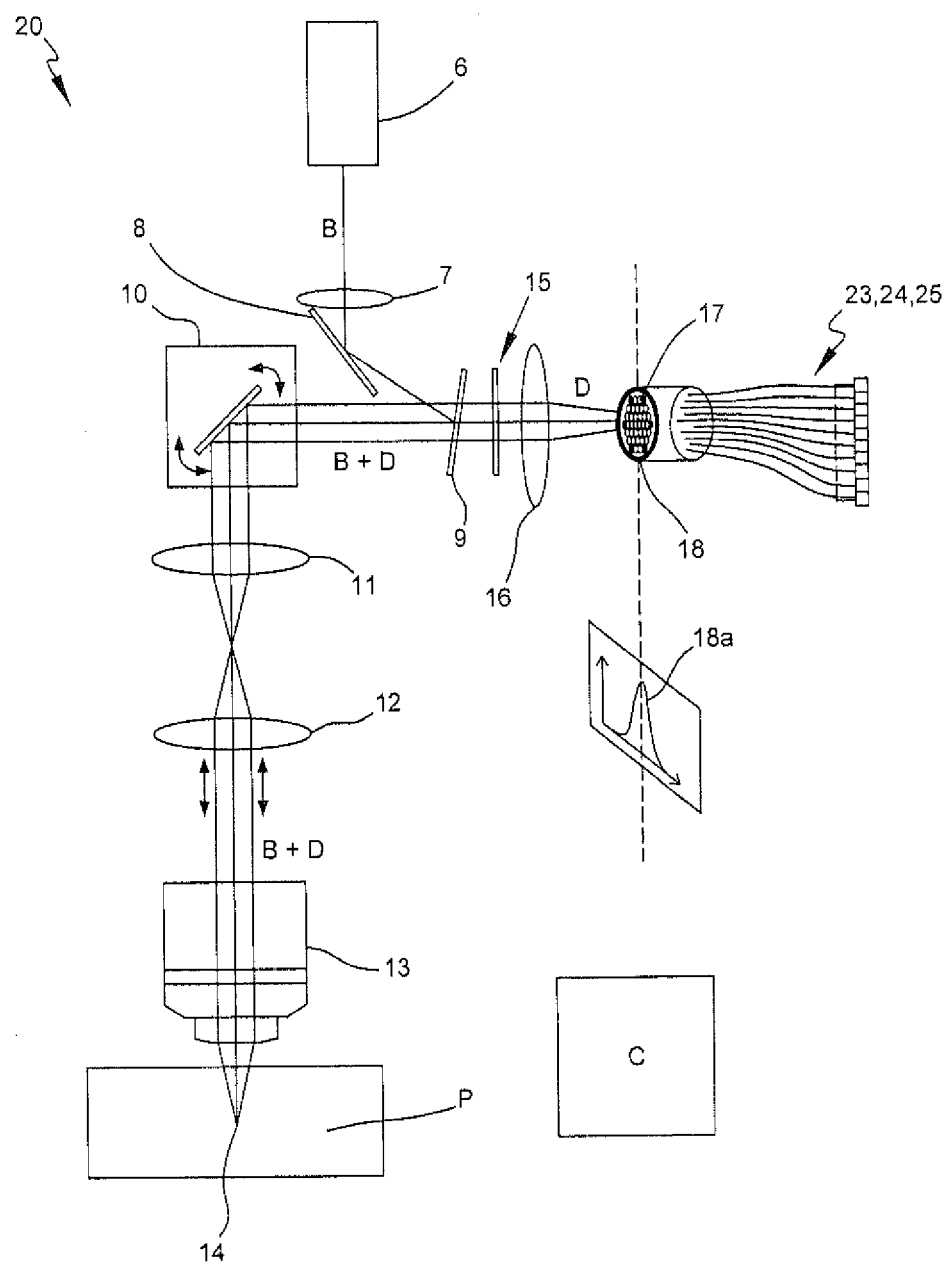
FIG. 1 shows a schematic illustration of a laser scanning microscope for high resolution microscopy.

FIG. 1 schematically shows a laser scanning microscope 1 that is designed for the purpose of microscopy of a sample 2. The laser scanning microscope (abbreviated below as LSM) 1 is controlled by a control device C and comprises an illumination beam path 3 and an imaging beam path 4. The illumination beam path illuminates a spot in the sample 2, and the imaging beam path 4 images this spot, subject to the diffraction limit, for the purpose of detection. The illumination beam path 3 and the imaging beam path 4 share multiple elements. However, this is likewise less necessary than a scanned spot illumination of the sample 2. The same could also be illuminated in wide-field.

The illumination of the sample 2 in the LSM 1 is carried out by means of a laser beam 5 that is coupled into a mirror 8 via a deflection mirror 6 that is not specifically functionally necessary, and a lens 7. The mirror 8 functions so that the laser beam 5 falls on an emission filter 9 at a reflection angle. To simplify the illustration, only the primary axis of the laser beam 5 is drawn.

Following the reflection on the emission filter 9, the laser beam 5 is deflected biaxially by a scanner 10, and focused by means of lenses 11 and 12 through an objective lens 13 to a spot 14 in the sample 2. The spot in this case is point-shaped in the illustration in FIG. 1, but a linear spot is also possible. Fluorescence radiation excited in the spot 14 is routed via the objective lens 13, the lenses 11 and 12, and back to the scanner 10, after which a static light beam once more is present in the imaging direction. This passes through the emission filters 9 and 15, which have the function of selecting the fluorescence radiation in the spot 14, with respect to the wavelength thereof, and particularly of separating the same from the illumination radiation of the laser beam 5, which may serve as excitation radiation, by way of example. A lens 16 functions so that the spot 14 overall is imaged into a diffraction-limited image 17 which lies in a detection plane 18. The detection plane 18 is a plane which is conjugate to the plane in which the spot 14 in the sample 2 lies. The image 17 of the spot 14 is captured in the detection plane 18 by a detector device 19 which is explained in greater detail below in the context of FIGS. 2 to 4. In this case, it is essential that the detector device 19 spatially resolves the diffraction-limited image 17 of the spot 14 in the detection plane 18.

The intensity distribution of the spot over the detection cross-section (the Gaussian distribution) in 18 is illustrated below as 18a in FIG. 1.

The control device C controls all components of the LSM 1, particularly the scanner 10 and the detector device 19. The control device captures the data of each individual image 17 for different scan positions, analyzes the diffraction structure thereof, and generates a high resolution composite image of the sample 2.

The LSM 1 in FIG. 1 is illustrated by way of example for a single spot that is scanned on the sample. However, it may also be used for the purpose of scanning according to a linear spot that extends, by way of example, perpendicularly to the plane of the drawing in FIG. 1. It is also possible to design the LSM 1 in FIG. 1 in such a manner that multiple adjacent point spots in the sample are scanned. As a result, their corresponding single images 17 lie in the detection plane 18, likewise adjacent to one another. The detector device 19 is then accordingly designed to detect the adjacent single images 17 in the detection plane 18.

The detector device 19 is shown enlarged in FIG. 2. It consists of an optical fiber bundle 20 which feeds a detector array 24. The optical fiber bundle 20 is built up of individual optical fibers 21. The ends of the optical fibers 21 form the optical fiber bundle input 22, which lies in the detection plane 18. The individual ends of the optical fibers 21 therefore constitute pixels by means of which the diffraction-limited image 17 of the spot 14 is captured. Because the spot 14 in the embodiment in FIG. 1 is, by way of example, a point spot, the image 17 is an Airy disk, the size of which remains inside the circle which represents the detection plane 18 in FIGS. 1 and 2. The size of the optical fiber bundle input 22 is therefore such that the size of the Airy disk is covered thereby. The individual optical fibers 21 in the optical fiber bundle 20 are given a geometric arrangement at their outputs that is different from that at the optical fiber bundle input 22, particularly in the form of an extended plug 23, in which the output ends of the optical fibers 21 lie adjacent to one another. The plug 23 is designed to match the geometric arrangement of the detector row 24—i.e. each output end of an optical fiber 21 lies precisely in front of a pixel 25 of the detector row 24.

The geometric dimensions of the redistribution element are matched entirely fundamentally—meaning that they are matched on the input side thereof to the dimensions of the single image (and/or, in the case of multiple point-spots, to the adjacent single images), regardless of the implementation of the redistribution element, which is made in FIG. 4 by an optical fiber bundle. The redistribution element has the function of capturing the radiation from the detection plane 18 in such a manner that the intensity distribution of the single image 17, measured by the sampling theorem, is oversampled with respect to the diffraction limit. The redistribution element therefore has pixels (formed by the input ends of the optical fibers in the construction shown in FIG. 3) lying in the detection plane 18, which are smaller by at least a factor of 2 than the smallest resolvable structure produced in the detection plane 18 from the diffraction limit, taking into account the imaging scale.

Of course, the use of a plug 23 is only one of many possibilities for arranging the output ends of the optical fibers 21 in front of the pixels 25. It is equally possible to use other connections. In addition, the individual pixels 25 may be directly fused to the optical fibers 21. It is not at all necessary to use a detector row 24. Rather, an individual detector may be used for each pixel 25.

FIGS. 3 and 4 show possible embodiments of the optical fiber bundle input 22. The optical fibers 21 may be fused together at the optical fiber bundle input 22. In this way, a higher fullness factor is achieved, meaning that holes between the individual optical fibers 21 at the optical fiber bundle input 22 are minimized. The fusing would also lead to a certain crosstalk between adjacent optical fibers. If it is desired to prevent this, the optical fibers may be glued. A square arrangement of the ends of the optical fibers 21 is also possible, as FIG. 4 shows.

The individual optical fibers 21 are preferably assigned to the individual pixels 25 of the detector array 24 in such a way that the optical fibers 21 positioned adjacent to one another at the optical fiber bundle input 22 are also adjacent at the detector array 24. By means of this approach, crosstalk in minimized between adjacent pixels 25, whereby the said crosstalk may arise, by way of example, from scatter radiation or during the signal processing of the individual pixels 25. If the detector array 24 is a row, the corresponding arrangement may be achieved by fixing the sequence of the individual optical fibers on the detector row using a spiral which connects the individual optical fibers one after the other in the perspective of a top view of the detection plane 18.

FIG. 3 further shows blind fibers 26 which lie in the corners of the arrangement of the optical fibers 21 at the optical fiber bundle input 22. These blind fibers are not routed to pixels 25 of the detector array. There would no longer be any signal intensity required for the evaluation of the signals at the positions of the blind fibers. As a result, one may reduce the number of the optical fibers 21, and therefore the number of the pixels 25 in the detector row 24 or the detector array, in such a way that it is possible to work with 32 pixels, by way of example. Such detector rows 24 are already used in other ways in laser scanning microscopy, with the advantage that only one signal-evaluation electronic unit needs to be installed in such laser scanning microscopes, and a switch is then made between an existing detector row 24 and the further detector row 24 which is supplemented by the detector device 19.

According to FIG. 4, optical fibers with a square base shape are used for the bundle. They likewise have a high degree of coverage in the detection plane, and therefore efficiently collect the radiation.

Figure 5:
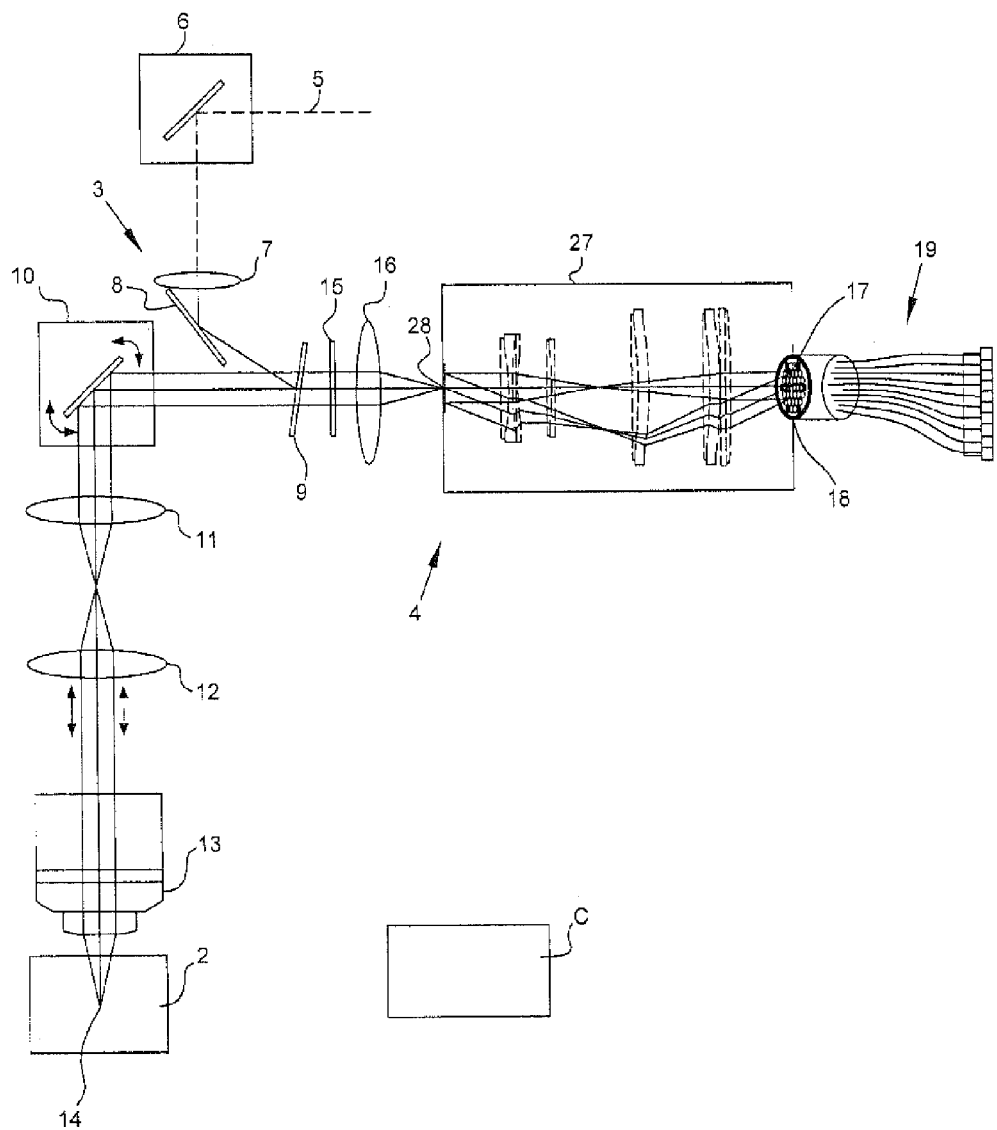
FIG. 5 shows an implementation of the microscope in FIG. 1 using a zoom lens for the purpose of adapting the size of the detector field.

FIG. 5 shows one implementation of the LSM 1 in FIG. 1, whereby a zoom lens 27 is arranged in front of the detection plane 18. The conjugated plane in which the detection plane 18 was arranged in the construction shown in FIG. 1 now forms an intermediate plane 28 from which the zoom lens 27 captures the radiation and relays the same to the detection plane 18. The zoom lens 27 makes it possible for the image 17 to be optimally matched to the dimensions of the input of the detector device 19.

Figure 6:
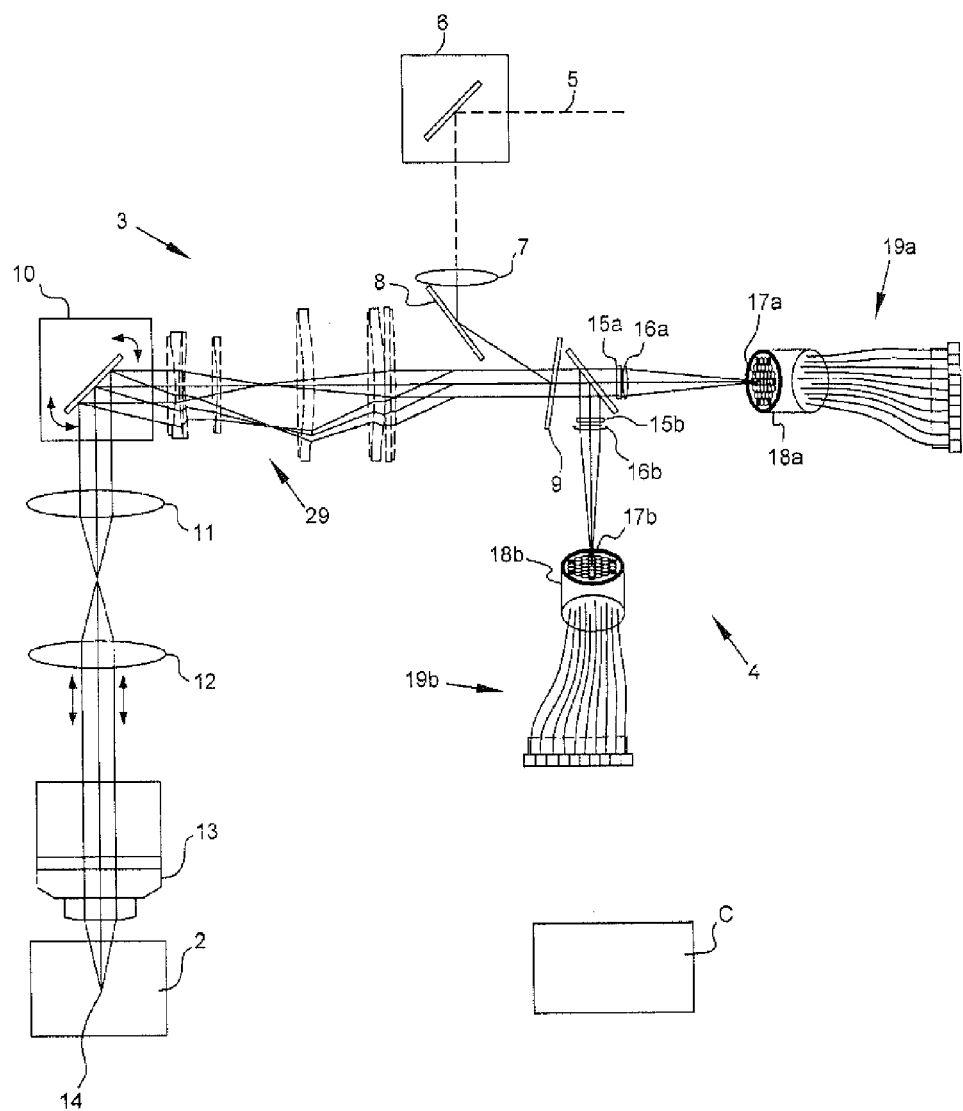
FIG. 6 shows a modification of the microscope in FIG. 5 with respect to the zoom lens and with respect to a further implementation for multi-color imaging.

FIG. 6 shows yet another modification of the laser scanning microscope 1 in FIG. 1. On the one hand, the zoom lens is arranged in this case as the zoom lens 29 in such a way that it lies in a part of the beam path, the same being the route of both the illumination beam path 3 and the imaging beam path 4. As a result, there is the additional advantage that not only the size of the image 17 on the input side of the detector device 19 may be adapted, but also that the aperture fullness of the objective lens 13, relative to the imaging beam path 4, and therefore the utilization of the laser beam 5, may be adapted as well.

In addition, the LSM 1 in FIG. 6 also has a two-channel design, as a result of the fact that a beam splitter is arranged downstream of the emission filter 9 to separate the radiation into two separate color channels. The corresponding elements of the color channels each correspond to the elements that are arranged downstream of the emission filter 9 in the imaging direction in the LSM 1 in FIG. 1. The color channels are differentiated in the illustration in FIG. 6 by the reference number suffixes "a" and "b."

Of course, the implementation using two color channels is independent of the use of the zoom lens 29. However, the combination has the advantage that a zoom lens 27 that would need to be independently included in each of the color channels and would, therefore, be present twice, is only necessary once. However, the zoom lens 27 may also, of course, be used in the construction according to FIG. 1, while the LSM 1 in FIG. 6 may also be realized without the zoom lens 29.

Figure 7:
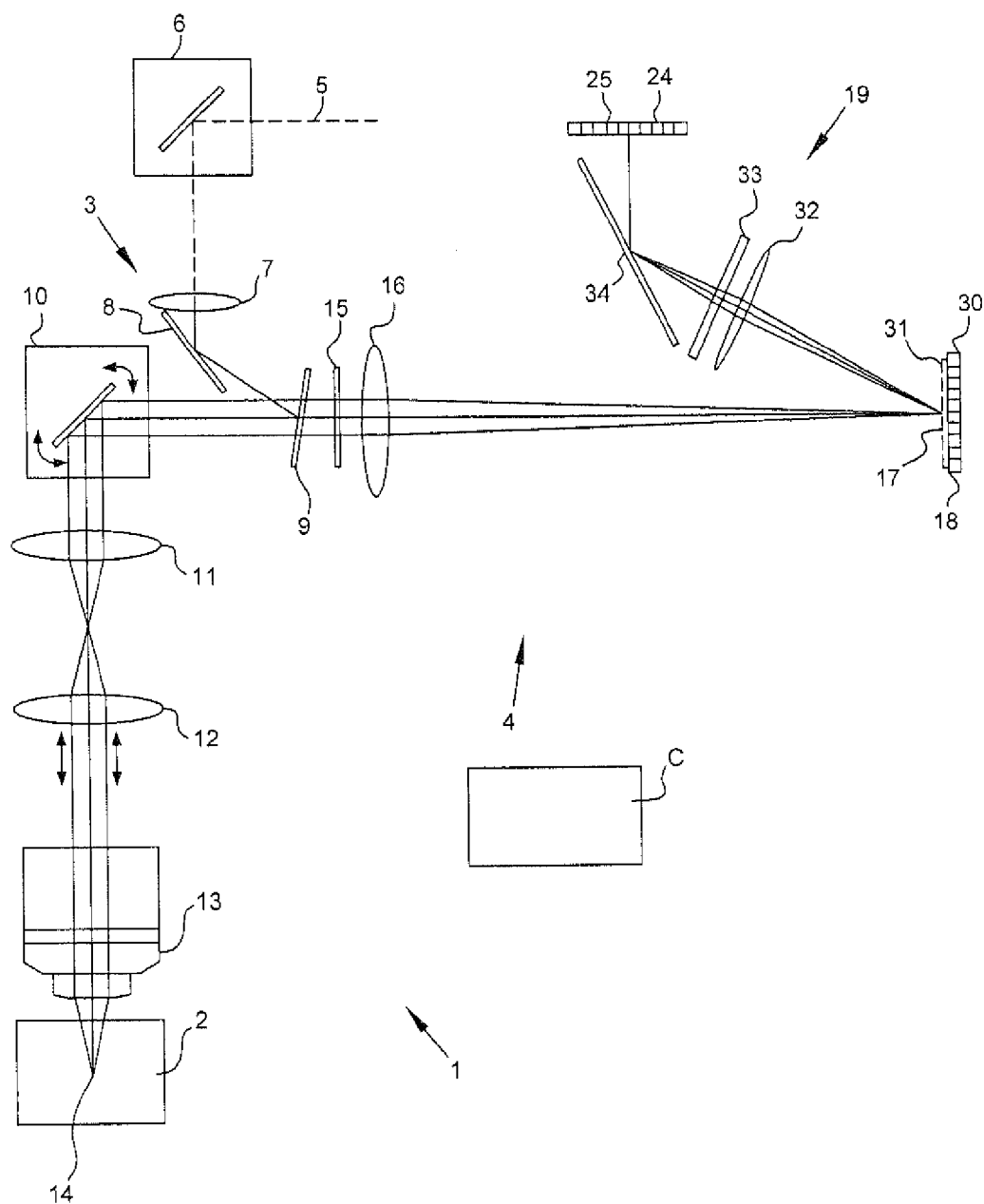
FIG. 7 shows a modification of the microscope in FIG. 1, whereby the modification pertains to the detector device.

FIG. 7 shows a modification of the LSM 1 in FIG. 1, with respect to the detector device 19.

The detector device 19 now has a multi-facet mirror 30 carrying individual facets 31. The facets 31 correspond to the ends of the optical fibers 21 at the optical fiber bundle input 22 with respect to the resolution of the image 17. The individual facets 31 differ with respect to their inclination from the optical axis of the incident beam. Together with a lens 32 and a mini-lens array 33, as well as a deflector mirror 34 that only serves the purpose of beam folding, each facet 31 reproduces a surface area segment of the single image 17 on one pixel 25 of a detector array 24. Depending on the orientation of the facets 31, the detector array 24 in this case may preferably be a 2D array. However, a detector row is also possible.

Figure 8:
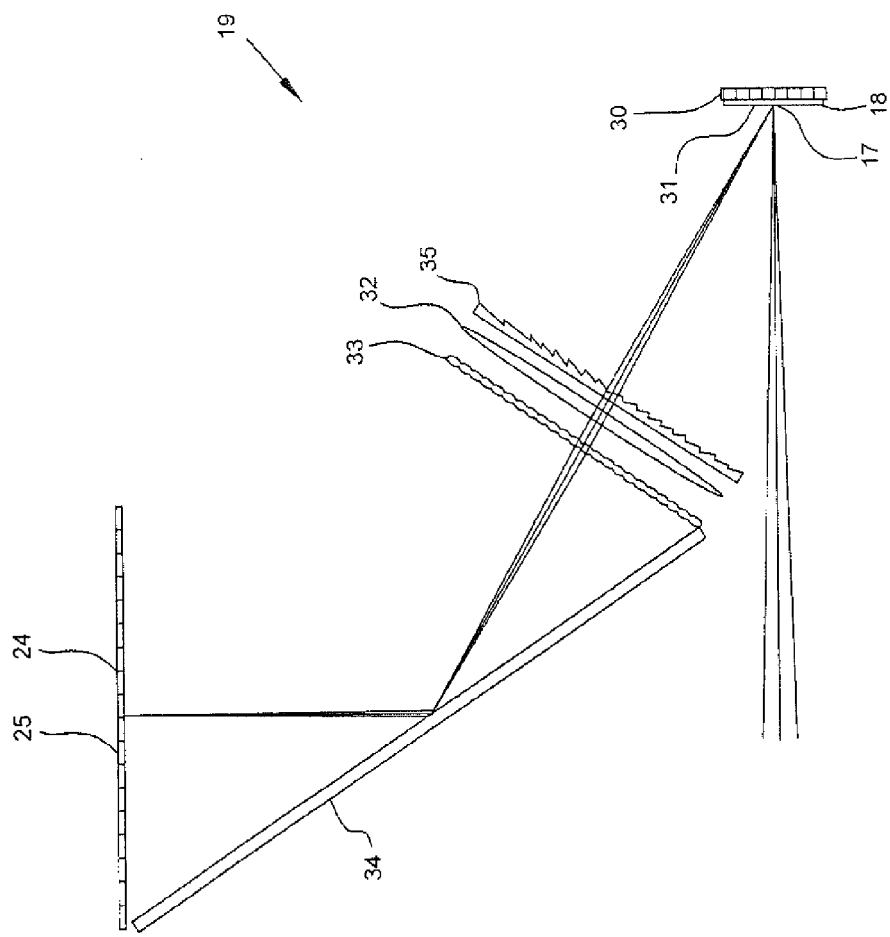
FIG. 8 shows a modification of the detector device 19 in FIG. 7.

FIG. 8 shows one implementation of the detector device 19 in FIG. 7, whereby a refractive element 35 is still arranged in front of the lens 32, and distributes the radiation particularly well to a detector row.

The detector array 24 may, as already mentioned, be selected based on its geometry, with no further limitations. Of course, the redistribution element in the detector device 19 must then be matched to the corresponding detector array.

The size of the individual pixels with which the image 17 is resolved is also no longer pre-specified by the detector array 24, but rather by the element which produces the redistribution of the radiation from the detection plane 18. For an Airy disk, the diameter of the disk in a diffraction-limited image is given by the formula 1.22·λ/NA, whereby X is the average wavelength of the imaged radiation, and NA is the numerical aperture of the objective lens 13. The full width at half maximum is then 0.15·λ/NA. In order to achieve high resolution, it is sufficient for location accuracy of the detection to be made twice as high as the full width at half maximum, meaning that the full width at half maximum is sampled twice. A facet element 31 and/or an end of an optical fiber 21 at the optical fiber bundle input 22 may therefore be, at most, half as large as the full width at half maximum of the diffraction-limited single image. This, of course, is true taking into account the imaging scale which the optics behind the objective lens 13 produces. In the simplest case, a 4×4 array of pixels in the detection plane 18 per full width at half maximum would thereby be more than adequate.

The zoom lens which was explained with reference to FIGS. 5 and 6, makes possible—in addition to a [size] adaptation in such a way that the diffraction distribution of the diffraction-limited image 17 of the spot 14 optimally fills out the input face of the detector device 19—a further operating mode, particularly if more than one Airy disk is imaged in the detection plane 18. In a measurement in which more than one Airy disk is imaged on the detector device 19, light from further depth planes of the sample 2 may be detected on the pixels of the detector device 19 that lie further outwards. During the processing of the image, additional signal strengths are obtained without negatively influencing the depth resolution of the LSM 1

Additional prior art literature includes:
[1] Heintzmann R.: Cremer C.: Laterally Modulated Excitation Microscopy: Improvement of resolution by using a diffraction grating; In *Proceedings of SPIE*, Vol. 3568 (1998)
[2] Shao L.; Kner P.; Hesper E; Gustafsson Mats G. L: Super-resolution 3D-microscopy of live whole cells using structured illumination; in *Nature Methods*, Vol. 8 (2011)
[3] Littleton B.; Lai K.; Longstaff D.; Sarafis V.; Munroe P.; Heckenberg N.; Rubinsztein-Dunlop H.: Coherent super-resolution microscopy via laterally structured illumination; in *Micron*, Vol. 38 (2007), P. 150
[4] Karadaglic D. and Wilson T.: Image formation in structured illumination wide-field fluorescence microscopy; in *Micron*, Vol. 39 (2008), P. 808
[5] Chowdhury S.; Dhalla A.-H.; Izatt J.: Structured oblique illumination microscopy for enhanced resolution imaging of non-fluorescent, coherently scattering samples; in *Biomedical Optics Express*, Vol. 3 (2012), P. 1841
[6] Bertero et al., in *Inverse Problems* 3, 195 (1987)
[7] Cox et al., *Optik* 60, No. 4, 391, (1982)
[8] Sheppard C. et al., *Optik* 80, No. 2, 391, (1988)
[9] Grochmalicki et al., in *J. Opt. Soc. Am. A* 10, 1074 (1993)
[10] C. B. Mueller et al., in *Phys. Rev. Lett.* 104 (2010)
[11] Hamilton D. K. and Sheppard J. R.: A confocal interference microscope; in *Optica Acta* 29 (1982), p. 1573
[12] Gerchberg R. W. and Saxton W. O.: Phase determination from image and diffraction plane pictures in the electron microscope; in Optik 35 (1972), p. 237
[13] Ralph W. Gerchberg: SYSTEM AND METHOD FOR RECOVERING PHASE INFORMATION OF A WAVE FRONT; In U.S. Pat. No. 6,545,790 B2
[14] Ralph W. Gerchberg; Louise Gerchberg: LIGHT MICROSCOPE WITH NOVEL DIGITAL METHOD TO ACHIEVE SUPER-RESOLUTION; in US 2011/0032586A1
[15] Foreman M. R.; Giusca C. L.; Török P.; Leach R. K.: Phase retrieved pupil function and coherent transfer function; In *Journal of Microscopy* 251 (2013), p. 99
[16] W. Becker, "Advanced time-correlated single photon counting techniques," Springer 2005, P. 144.

In a generic laser scanning microscope (LSM), an increase in resolution is achieved by the so-called pinhole in front of the detector being reduced to a size which is significantly smaller than the diffraction limit (≤Airy/4). In this case, this is called a confocal laser scanning microscope.

The "Airy" is defined via the first zero point of a detection light illumination spot, and is an established term in the technical literature of optics.

In the case of a generic fluorescence LSM, there is a decisive disadvantage in the current methods used to achieve increased resolution: the very poor signal-to-noise ratio as a result of the low number of detected photons which come from the sample due to the early-closed pinhole, which in practice leads to a situation where it is impossible to improve the resolution.

In confocal laser scanning material microscopy, this disadvantage does not exist. In this case, there are generally sufficient photons for the detection. The optical transfer function of the entire system with an essentially closed pinhole consists, at a first approximation, of the folding of the pupil functions. Up to the Stokes displacement of the fluorescence, for illumination, the transfer function has the shape and width of the transfer function in wide-field fluorescence microscopy. This means that higher object frequencies are transmitted, but their weighting is less than that of the lower object frequencies.

However, at this point, it is also possible to increase the resolution of a laser scanning microscope, with a simultaneously improved signal-to-noise ratio. For this purpose, a configuration must have a larger pinhole diameter (approx. 1 Airy), which means a higher number of detectable photons, and must have a detection with sub-Airy spatial resolution. Following the capture of the image, a re-sorting and classification of the data is carried out by means of a special algorithm. This then leads to an increased resolution in the sample image. This method, from Colin Sheppard is also termed the accumulation of shifted sub-Airy detector values in the literature (see items [6]-[10] of the prior art listed above).

The methods named do not only function for fluorescing samples, they can also be used for the imaging of coherently interacting material samples. In this case, the method hardly offers advantages with respect to the detection photon budget. Rather, the advantage is that the total transmission function has double the bandwidth, substantially dependent on the pupil function. This means that the higher object frequencies have the same weighting as the lower object frequencies.

However, a prerequisite for the method to be used for coherently interacting material samples is that both the amplitude and the phase are measured with a sub-Airy spatial resolution and with a high sampling rate.

To date, the implementation of the named method has not become widespread because there is a shortage in the laser scanning microscope sector of fast (integration time of typically ≥1 µs), suitably large, sensitive, and low-noise multi-element detector arrangements with an accordingly high number of detector elements (typically >30 is necessary) in the sub-mm range. In addition, the spatial light distribution on the detection device must be detected very precisely, which requires corresponding time and effort for adjustment, and is prone to error.

A PMT array requires large detector elements; for this reason, very high constructed lengths would be necessary.

An SPAD array does not achieve high count rates in Geiger mode, as can occur, nevertheless, despite spatially resolved sub-Airy detection.

In addition, it is not possible to use sensitive wide-field detectors (e.g. CCD or EMCCD) in the named method. They cannot be read out at the required speed in full frame. However, it the method is intended to be combined with a wide-field detector, then it is necessary to generate standing illumination patterns similar to structured wide-field microscopy, which again disadvantageously increases the number of necessary images.

The problem addressed by the invention can be seen as that of overcoming the disadvantages of the named, established light-microscopy methods with structured illumination light.

One essential feature of the invention is that, by means of the preferred technical embodiments, it is possible to achieve increases in resolution with a good signal-to-noise, and with an a priori improved weighting of the higher spatial frequencies when material samples are used.

Solutions according to the invention are the subject matter of the independent claims below. Preferred implementations are the subject matter of the dependent claims.

The present invention relates to multiple methods according to the invention for the spatial measurement of the complex transmission and/or reflection properties (amplitude and/or phase distribution) of a sample having microstructures, for example a material sample or, by way of example, a semiconductor chip.

For the purpose of determining the phase function of a sample, interferometric measurement methods are generally used [11]. However, these methods require complex optical arrangements which must ensure high interferometric system stability. In addition, for a clear determination of the spatial phase distribution, multiple phase shifts are necessary between the illumination light transmitted and/or reflected by the object and the reference light.

Suitable methods in wide-field microscopy are generally accompanied by interfering patterns (speckles), or demonstrate the deficiency of a direct optical sectioning.

In this case, methods which scan with an illumination spot have more suitable properties. An optical sectioning occurs even with only a pinhole size of one Airy, and interfering patterns are much less visible than in wide-field methods.

However, methods which scan with an illumination spot are not characterized by high image capture speeds. An improvement in this regard is provided by the use of resonant Galvo scanners (up to 30 frames/s). However, at these high scan speeds, there are resulting brief pixel integration times, which makes it necessary to use PMT arrays or APD arrays. In material sample microscopy, simple photo diode arrays (PDAs) can also sometimes be used.

PMT arrays are suitable for larger photon streams which are necessary for a "good" image with high SNR. However, PMT arrays have large dimensions, among other things, such that a suitable illumination requires large optical focal distances for the focusing lens. In this case, fiber bundles (see literature item [16]) can provide a solution, enabling a non-imaging flexible redistribution of the light. This is illustrated in detail above with reference to FIGS. 1-8.

The combination of fiber bundles with an array detector, however, is not yet sufficient to make it possible to implement the method. With such a solution, the phase distribution would still be inaccessible. To obtain the phase distribution, either wavefront sensors or interferometric and/or holographic methods, or so-called "phase retrieval" methods can be used.

A first advantageous alternative to iphase measurement is illustrated by the phase gradient method according to Shack and Hartmann:

http://de.wikiPedia.org/wiki/Hartmann-Schack-Sensor

The Hartmann-Shack sensor consists of a two-dimensional lens array and an optical 2D detector (CMOS and/or CCD chip).

Each of the lenses generates an image in the focal plane which is shifted with respect to a reference position according to the local slope of the wavefront.

This shift can be measured by the location-sensitive detectors. By using an analysis of the local deflections of the points from their ideal positions, it is possible to come to an understanding of the local slope behavior of the incident wavefront. This phase information is converted into a measurable intensity distribution.

A two-dimensional lens array is combined with a two-dimensional detector. Each microlens generates a spot in its focal plane, with a position which can be shifted with respect to a reference position according to the slope of the local wavefront.

According to the invention, a microlens array is placed in front of the fiber bundle according to the above description in order to make it possible to apply the principle of the Shack-Hartmann sensor to the confocal laser scanning microscopy method.

This preferred embodiment of an ultra-fast Shack-Hartmann sensor is based thereon for confocal laser scanning material microscopy.

Another alternative for the wavefront measurement is the so-called "wavefront imaging sensor" which has been developed by Yang et al. (e.g. Opt. Lett. 37, 199, 2012). Rather than a lens array, this configuration would use an aperture array which can be applied to the fiber bundle at a certain distance.

A likewise further alternative to the wavefront measurement is the so-called "partitioned aperture wavefront" (PAW)" method of Mertz. et al. and/or Iglesias (e.g. Mertz et al., Opt. Lett. 37, 4062, 2012 or Iglesias, Opt. Lett. 36, 3636, 2011). In this case, a lens array and/or a pyramidal prism would need to be inserted in the Fourier plane in front of the pinhole plane, as a portioning element which typically generates four, and in any case at least three, laterally displaced replica images in the pinhole plane, on a camera array. Because the replicas can be generated based on the partitioning elements from different sub-regions of the angular spectrum, conclusions can be derived about the wavefront, and therefore about the phases, from the relative intensity of the replicas.

By way of example, the field of interferometric sensors includes the wavefront sensor SID4Bio produced by the Phasics S. A. company. The basic principle thereof, "quadriwave lateral shearing" interferometry, has been explained by Bon et al., for example (see Opt. Express 17, 13080, 2009, for example). In this case, a chessboard pattern mask is inserted into the intermediate image plane in front of the sensor, and the interference of the different diffraction orders is exploited for the phase measurement. Such an arrangement can also be contemplated in an LSM with an array detector. The same is true for other comparable interferometric and/or holographic arrangements, whereby the reference field is likewise obtained directly from light fractions which originated from the sample. One example is the holographic Lloyd microscope of Anand et al. (Opt. Lett. 37, 5127, 2012).

Different further examples are described in a review by G. Popescu (Methods in Cell Biology, Vol. 90, 87, 2008).

One interferometric arrangement which is not based on self-interference is described, by way of example, in Zhao et al. (Appl. Opt. 50 655, 2010). In this case, a beam path having an interferometer based on a reference mirror is described. The reference light therefore does not originate in the sample itself. Four different phase deviations are measured in parallel as in the so-called "phase shifting" principle, using a clever arrangement. As an alternative, the reference mirror could also be moved axially. If the confocal microscope shown according to the invention is equipped with at least one array detector instead of point detectors, then it is again possible to measure the phase with spatial resolution.

Figure 13:
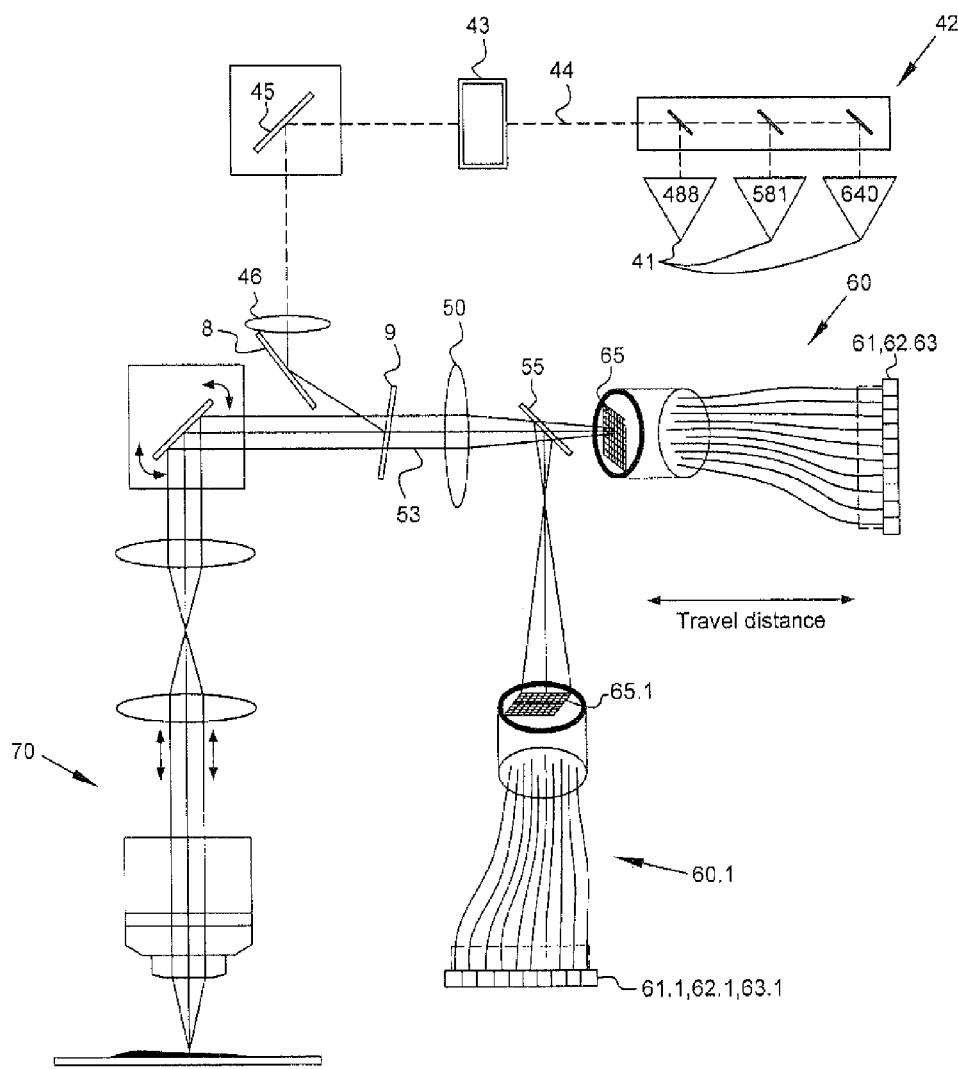
FIG. 13 shows a preferred technical embodiment whereby the phase retrieval method is used for the purpose of determining the amplitude and phase distribution.

In addition to interferometry and/or holographic methods, as well as wavefront methods such as the Shack-Hartmann wavefront gradient methods, there is a further advantageous method for determining the spatial amplitude distribution and wavefront distribution. This is the so-called "phase retrieval method" which typically is based on the Gerchberg-Saxton algorithm (see literature item [12]). There are substantially two embodiments as far as the measurements for implementing the method are concerned:

a) The intensity is measured in two planes connected to each other by the optical wave propagation, and then the spatial wavefront distribution is calculated by means of iterative (Fourier) algorithms [13](FIG. 13).

b) The intensity is measured multiple times in only one plane, whereby suitable filter functions are used in a plane which is upstream with respect to the direction of propagation, and the spatial wavefront distribution is likewise calculated by means of iterative (Fourier) algorithms [14].

The phase retrieval method named above is used according to the invention, like the other methods named above, in a confocal laser scanning microscope as described in FIGS. 1-8. The purpose in this case is the measurement of the wavefront of the light distribution below the diffraction limit, i.e. with sub-Airy resolution. This signifies new territory, and constitutes a boundary against current publications (point detector in the confocal microscope, for example literature item [15]). Only if the detection light distribution belonging to every position of the diffraction limited illumination spot is detected with spatially resolved sub-Airy resolution (below the diffraction limit) is it possible to expand (double) the coherent transfer function using the subsequent data re-ordering without the weighting of the higher spatial frequencies being less than that of the lower frequencies. At this point in time, there is no experiment in the literature which demonstrates this [15].

Additional features and advantages of the invention are described in greater detail below with reference to the attached schematic figures.

The reference numbers which are additional to those of FIG. 1-8 are:
- 41 light source
- 42 mirror cascade with semi-transparent mirrors/color splitters
- 43 acousto-optic tunable filter (AOTF)
- 44 illumination light
- 8, 45 mirror
- 46 collimating lens
- 47 zoom lens
- 9 primary color splitter
- 50 (tunable) detection lens
- 53 sample light
- 54 pinhole plane
- 55 (neutral) beam splitter
- 60 (ultra-fast) wavefront sensor, sub-Airy location resolving detection device
- 60.1 second (ultra-fast) wavefront sensor, second sub-Airy location resolving detection device
- 61 detection device
- 61.1 second detection device
- 62 detector element, detector pixels
- 62.1 detector element, detector pixels of the second detection device
- 63 detection plane
- 63.1 second detection plane
- 64 microlens array
- 65 fiber bundle
- 66 microlens spot
- 70 light microscope The Wavefront Method.

For material applications, the radiation which is reflected or transmitted and/or scattered by the sample is coherent, in contrast to the incoherent sample fluorescence radiation in fluorescent applications. The concrete wavefront position and distortion of the wavefront is determined for the coherent sample radiation by means of a wavefront sensor, and the phase shift is calculated therefrom.

For this purpose, at least 3, and preferably (due to the symmetry) four pixels (fiber input surfaces) per individual lens are used.

The resolution which can be achieved overall is consequently lower in the case of four pixels, but this is compensated for by the detection of the wavefront distribution. The number of the individual sensors and fibers can optionally be increased.

A high-resolution image is produced from the local phase/amplitude by calculation using an algorithm.

A calibration (determination of the zero point in the no-interference wavefront) can be performed, by way of example, using a flat mirror in the sample plane, or in a plane which is conjugate with respect to the same (zero-point measurement of the phase).

A correction of the phase using the determined values can be carried out point by point (per grid-located image point of the LSM) or image by image following the capturing of an image by the LSM, whereby the point by point correction can be faster.

Figure 9:
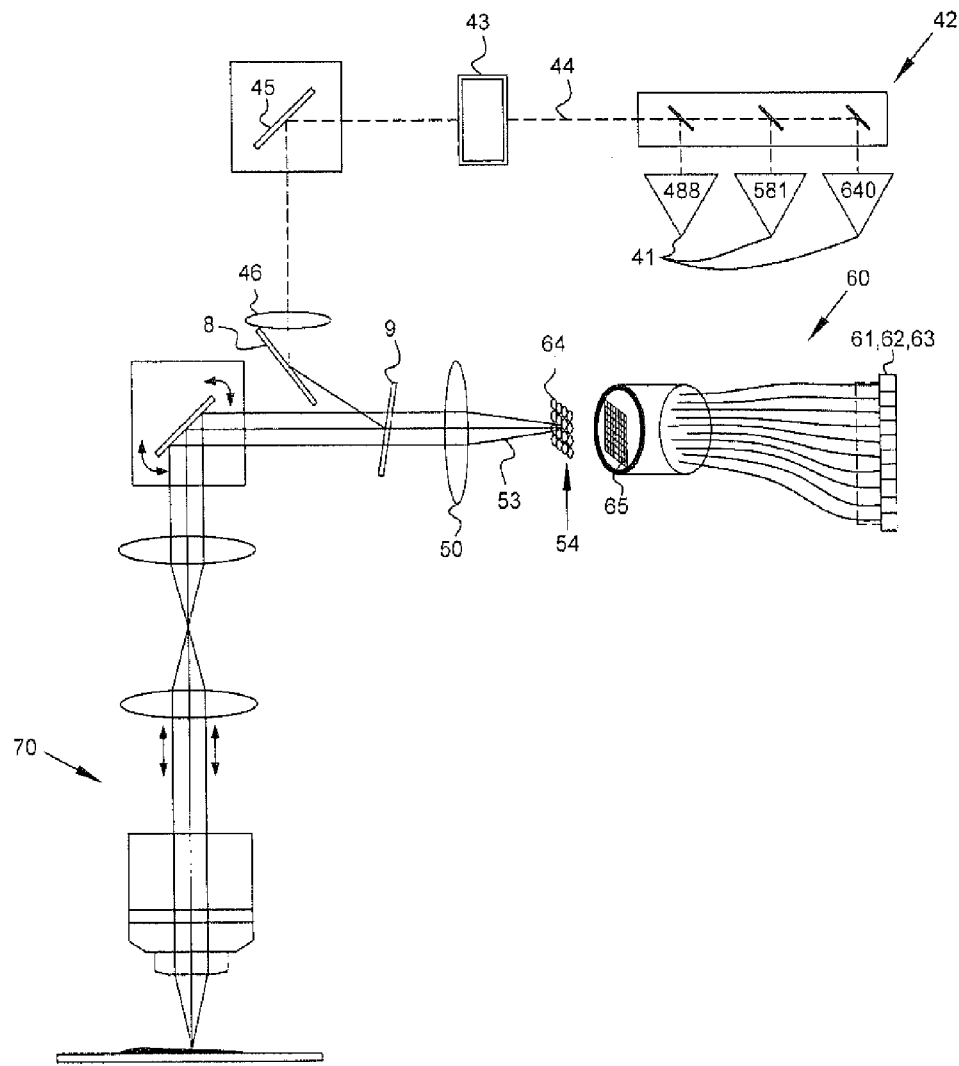
FIG. 9 shows a schematic illustration of a (laser scanning) light microscope 70.

FIG. 9 shows a schematic illustration of a (laser scanning) light microscope 70 according to FIGS. 1-8, with sub-Airy, spatially resolved amplitude and phase measurement using an ultra-fast wavefront sensor 60 with a detector array 61, 62, 63, fiber bundle 65, microlens array 64 in an image plane 54 corresponding to the pinhole plane of the LSM, which is conjugate with respect to the sample plane. The sample plane is transmitted into the plane of the microlenses via elements described in FIGS. 1-8, as well as via a detection lens 50, whereby the foci of the microlenses are at the input surfaces of the fiber bundle 65.

Figure 10A:
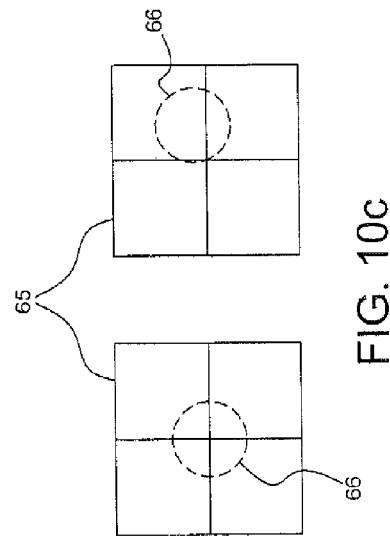
FIG. 10(a) shows the assignment of microlenses to light guide fibers of a fiber bundle.

FIG. 10(a) shows the assignment of microlenses to light guide fibers of a fiber bundle. One microlens 64 focuses on multiple fibers (≥4) of a bundle 65, in this case four.

Figure 10C:
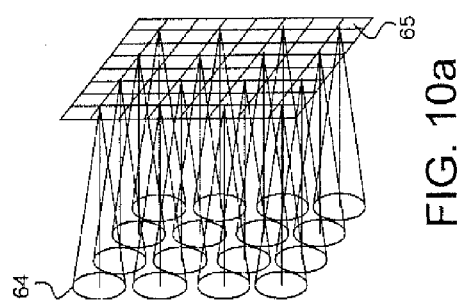
FIG. 10(c) illustrates receivers behind light guide fibers.
Figure 10B:
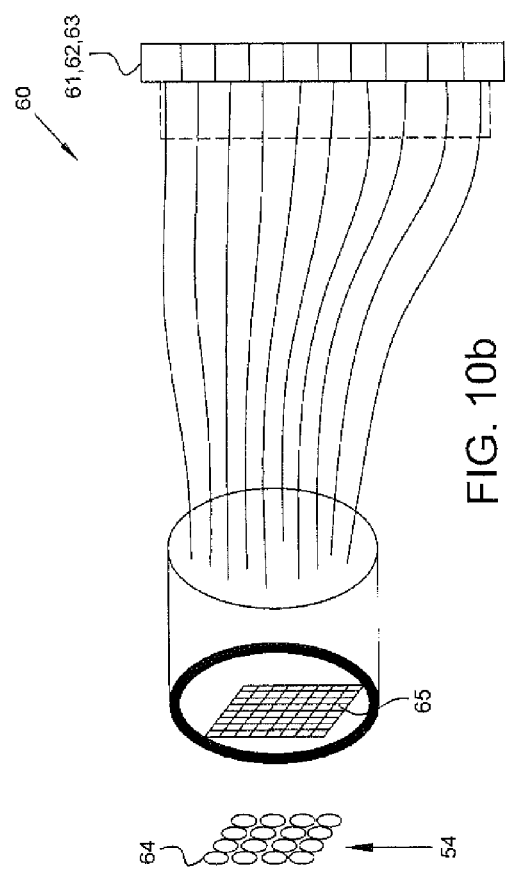
FIG. 10(b) shows the embodiment according to the invention of a fast wavefront sensor 60.
Figure 10D:
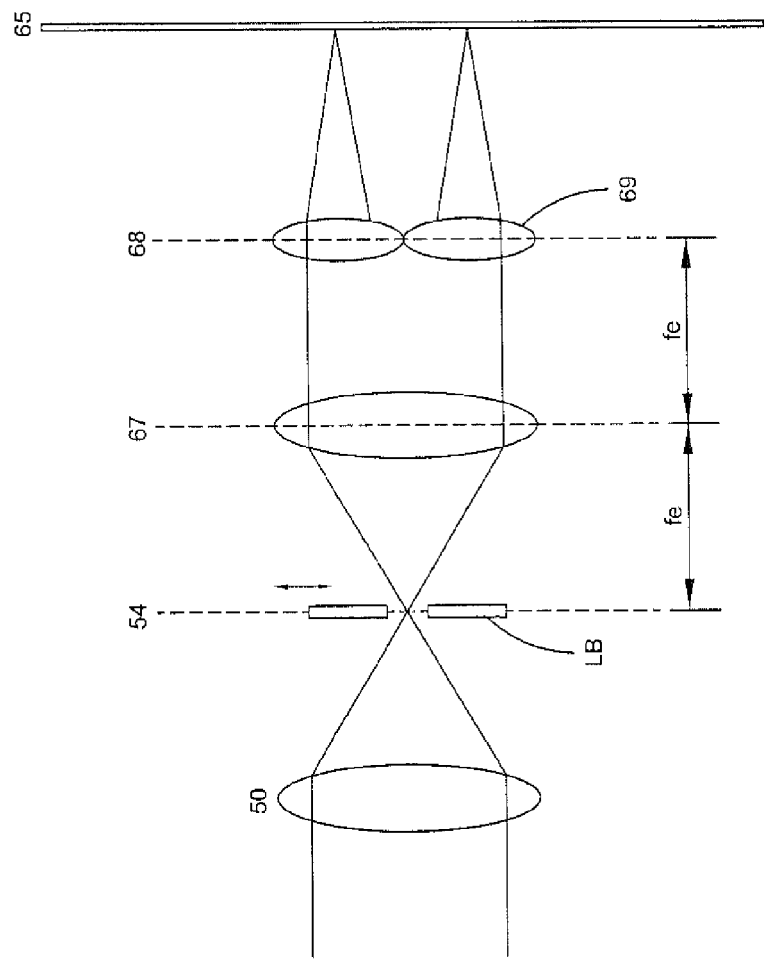
FIG. 10(d) illustrates a wavefront sensor.

FIG. 10(b) shows the embodiment-according to the invention of a fast wavefront sensor 60 consisting of a microlens array 64, a fiber bundle 65, and a sensitive, low-noise, and fast multi-element detection device 61. The microlens array 64 focuses the light distribution 53 inside an Airy diameter onto the fiber bundle array 65, with spatial resolution. In this configuration, multiple light guide fibers (≥3) belong to each microlens, and enable a lateral position determination of the focal position, particularly relative to a reference position. As a result, it is possible to determine the gradient of the wavefront, such that the spatially resolved profile of the wave-(phase) front is found via the light distribution with a size of approx. one Airy, following mathematical integration. A non-imaging redistribution of the photons on a sensitive, low-noise and fast multi-element detection device 61 is carried out by means of the fiber bundle 65. Alternatively, 64 can be an aperture array.

In FIG. 10(c), four receivers are illustrated behind each of the light guide fibers, in each case corresponding to four light guide fiber inputs to which light is applied by a microlens.

On the left side, an ideal position of the light spot 66 is illustrated with respect to the four receivers, said light spot 66 being generated by a microlens of the array 64.

It is created, as mentioned above, by calibration using a flat mirror, by way of example.

The four receivers receive the same light volume as a result of the central location of 66 and generate the same measurement signal.

A shifted light spot 66 is illustrated on the right side.

The four receivers receive different volumes of light. The position of the spot 66 can be determined from the measured light volumes of the four receivers as a precondition for the calculation of the phase front shift.

A wavefront sensor according to the PAW method (partitioned wavefront imager), according to Mertz et al. (see above) is illustrated schematically in FIG. 10 (d), with four off-axis lenses.

The light travels via the detection lens 50 and an adjustable aperture LB in a focus plane 54, for the purpose of limiting the light spot to, for example, approximately one Airy, by means of a 3f arrangement (fe focal length of the lenses), via one lens in plane 67 and four PAW lenses 69 in the plane 69 (only two of these are illustrated from the side), arranged in a plane which is optically conjugate with respect to the Fourier plane of the objective, focused by the above lenses into plane 65 of the light input surfaces, for example the fiber arrangement described in detail above, whereby light is applied to fiber input surfaces by each individual lens of the PAW lenses, and via detectors which are functionally assigned to these fiber input surfaces, and an intensity measurement is carried out in order to determine the deformation of the wavefront. In place of the PAW lenses, the glass pyramids indicated further above can also be substituted in 68.

If the preferred embodiment according to the invention of an ultrafast wavefront sensor 60 in a laser scanning microscope 70, named above, is integrated into a detection plane 63 or a pupil plane behind the same (FIG. 9), it is possible to determine the sub-Airy amplitude and phase (wave) distribution, which in turn enables the use of the Sheppard method—that is, it is possible to calculate a better transmission function for high spatial frequencies, and therefore it is possible to calculate an improved resolution.

According to FIG. 9, the preferred embodiment shown of a laser scanning microscope 70, as described in detail with reference to FIGS. 1-8, consists of an illumination beam path, a scanning device, a typical microscope system consisting of at least one tube lens, consisting of at least one objective and one sample space with a sample, toward which the illumination light is reflected. After interacting with the sample, the sample light is directed into a detection beam path to finally enter into the ultra-fast wavefront sensor 60 and be detected.

Figure 11:
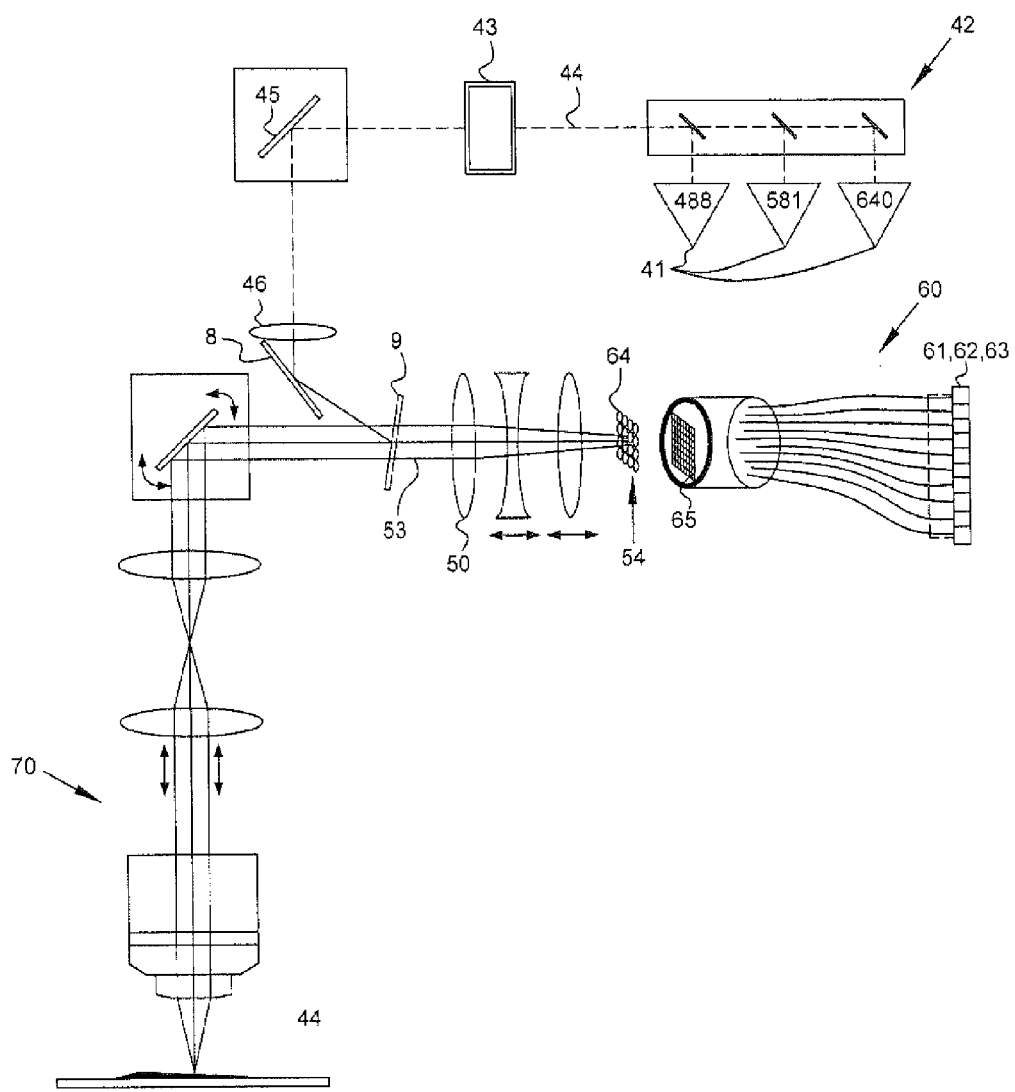
FIG. 11 shows a schematic illustration of a laser scanning microscope 70 having sub-Airy spatially resolved amplitude and phase measurement using an ultra-fast wavefront sensor 60.

FIG. 11 shows a schematic illustration of a laser scanning microscope 70 having sub-Airy spatially resolved amplitude and phase measurement using an ultra-fast wavefront sensor 60. An adjustable focusing lens 50 with a fixed focal length is positioned in the beam path for the size adjustment of the light distribution of the detection light 53 to the ultra-fast wavefront sensor 60 for an optimum sub-Airy sampling. In particular, the size/diameter of a single fiber should not be grater than one Airy/3.

Figure 12:
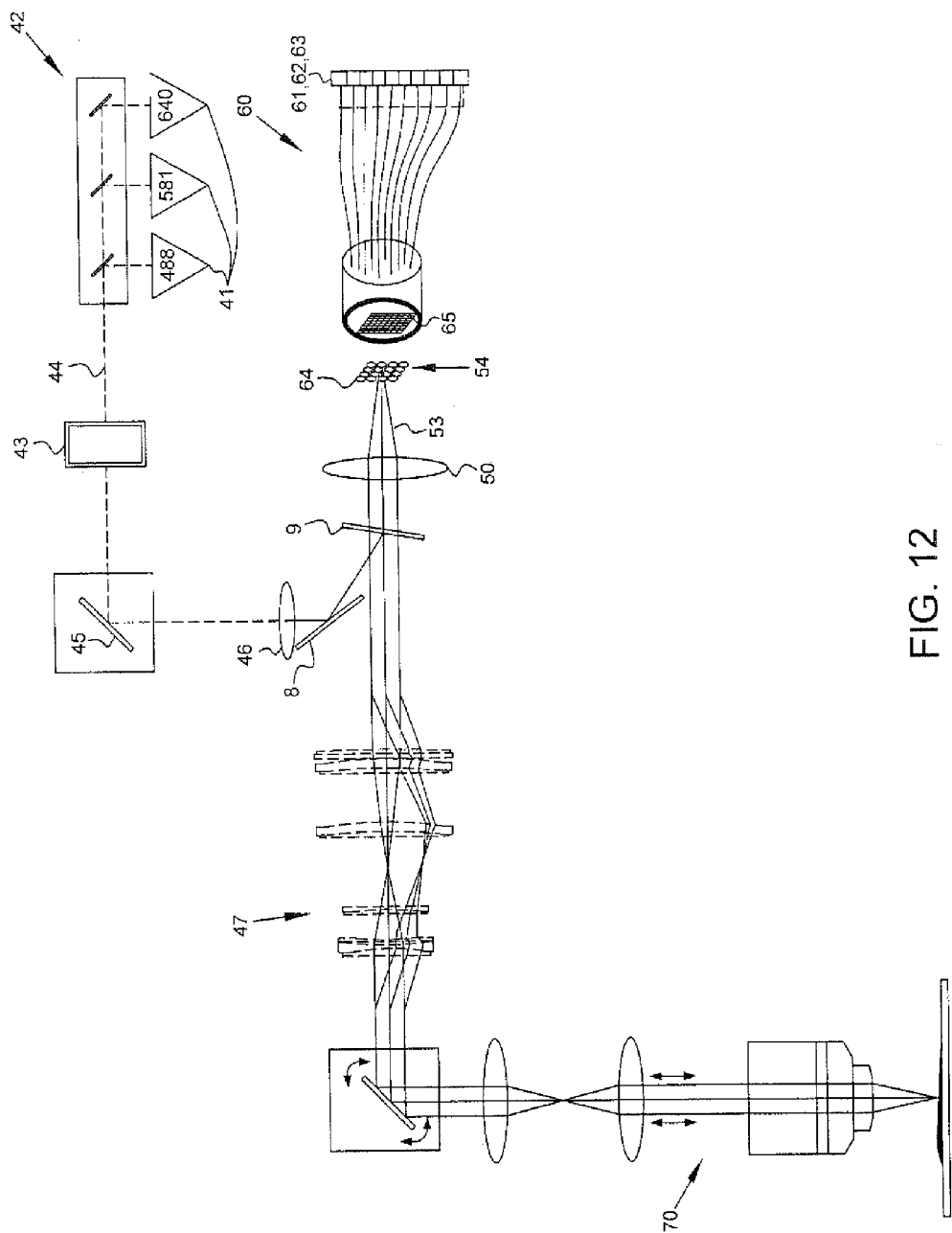
FIG. 12 shows a schematic illustration of a (laser scanning) light microscope 70 having sub-Airy spatially resolved amplitude and phase measurement using an ultra-fast wavefront sensor 60.

FIG. 12 shows a schematic illustration of a (laser scanning) light microscope 70 having sub-Airy spatially resolved amplitude and phase measurement using an ultra-fast wavefront sensor 60. A zoom lens 47 is positioned in the shared illumination and detection beam path (pupil) for the size adjustment of the light distribution of the detection light 53 to the ultra-fast wavefront sensor 60.

If such a configuration is used, it is possible thereby to optimally illuminate the object, and the detection light always maintains the same diameter in front of the detection lens 50. The wavelength dependency of the light distribution in the so-called "pinhole plane" 54, which is optically conjugate to the detected sample plane, can be compensated by the objective pupil being optimally irradiated for the smallest used illumination wavelength, and over-radiated for the greatest wavelengths, in order to always ensure the same size light distribution in the pinhole plane 54 on the microlens array 64.

The Phase Retrieval Method

In a first embodiment, a 50:50 beam splitter which can optionally be exchangeable with a color splitter for the purpose of chromatic separation is used in order to implement a detection via at least two substantially identical fiber bundles.

One of the detection devices in this case should be placed at the focal depth of the objective in the detection plane, due to the correct position information (amplitude).

The two partial beam paths generated by the beam splitter have a path length difference which can be adjustable.

During the sampling of the sample (image generation), the path length difference should be constant in order to avoid corresponding corrections.

FIG. 13 shows a preferred technical embodiment whereby the phase retrieval method is used for the purpose of determining the amplitude and phase distribution. The preferred technical embodiment is configured such that two sub-Airy, spatially resolving, sensitive, fast, fiber-based detection systems 60 and 60.1 are used without microlens arrays 65 and 65.1 in two different planes with respect to the pinhole plane 64 (focal plane), for the purpose of implementing the named method. One of the two detection devices 60 and 60.1 in this case can be placed in the pinhole plane 64. Using the two intensity images measured with spatial resolution for each scan position of the (diffraction limited) illumination spot, it is possible to calculate the spatial amplitude and wavefront distribution, and then the better-resolved image of the (material) sample.

In one embodiment which is even simpler, two or more images images [sic] are captured with a different sample position in the axial direction, and the two sub-Airy-resolved intensity values must then be calculated.

This can be carried out advantageously with an arrangement according to FIGS. 1-8.

In addition, approaches can be contemplated whereby chromatic longitudinal errors are exploited, together with a spectrally-filtered detection to detect the defocus information. In addition, there are approaches whereby diffractive optics are used to realize different focal planes.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. A microscope for high resolution scanning microscopy of a sample, comprising
    an illumination device for the purpose of illuminating the sample,
    an imaging device for the purpose of scanning at least one point or linear spot over the sample and of imaging the point or linear spot into a diffraction-limited, static single image, with an imaging scale in a detection plane,
    a detector device for the purpose of detecting the single image in the detection plane for various scan positions with a spatial resolution;
    an evaluation device for the purpose of evaluating a diffraction structure of the single image for the scan positions, using data from the detector device, and for the purpose of generating an image of the sample which has a resolution which is enhanced beyond the diffraction limit, said detector device having a detector array which has pixels and which is larger than the single image,
    a non-imaging redistribution element which is arranged in front of the detector array and which distributes the radiation from the detection plane onto the pixels of the detector array in a non-imaging manner, and
    means for wavefront detection wherein an amplitude and/or phase of a wavefront influenced by the sample is detected with spatial resolution through said means for wavefront detection.

2. The microscope according to claim 1, wherein said redistribution element comprises a bundle of optical fibers, preferably of multi-mode optical fibers, which has an input arranged in the detection plane, and an output where the optical fibers end at the pixels of the detector array in a geometric arrangement which differs from that of the input.

3. The microscope according to claim 2, wherein said optical fibers run from the input to the output-in such a manner that optical fibers which are adjacent the output are also adjacent the input in order to minimize a radiation intensity-dependent crosstalk between adjacent pixels.

4. The microscope according to claim 1, wherein said redistribution element has a mirror with differently inclined mirror elements, particularly a multi-facet mirror, a DMD, or an adaptive mirror, which deflects radiation from the detection plane onto the pixels of the detector array, whereby the pixels of the detector array have a geometric arrangement which differs from that of the mirror elements.

5. The microscope according to claim 1, wherein said imaging device has a zoom lens arranged in front of the detection plane in the imaging direction, for the purpose of matching the size of the single image to that of the detector device.

6. The microscope according to claim 5, wherein said illumination device and the imaging device share a scanning device such that the illumination device illuminates the sample with a diffraction-limited point or linear spot which coincides with the spot imaged by the imaging device, whereby the zoom lens is arranged in such a manner that it is also a component of the illumination device.

7. The microscope according to claim 1, wherein said detector array is a detector row.

8. The microscope according to claim 7, wherein said detector row is an APD row.

9. The microscope according to claim 7, wherein said detector row is an PMT row.

10. The microscope according to claim 1 wherein the influence of the sample on the phase is determined by means of a wavefront sensor.

11. The microscope according to claim 10, wherein the wavefront sensor is a Shack-Hartmann sensor.

12. The microscope according to claim 10, wherein the wavefront sensor is a WIS sensor.

13. The microscope according to claim 10, wherein the wavefront sensor is a PAW wavefront sensor or a pyramid sensor.

14. The microscope according to claim 1, wherein determination of the wavefront is performed using interferometric or holographic methods.

15. The microscope according to claim 1, wherein determination of the wavefront is performed using a phase retrieval method.

16. The microscope according to claim 1, further comprising a lens array arranged in front of light input surfaces of the redistribution element, said lens array directing light from each lens to light input surfaces.

17. The microscope according to claim 16, wherein the position of each lens spot is determined by means of the receivers which are functionally assigned to the light input surfaces via the intensity measurement of the light input surfaces to which light is directed.

18. The microscope according to claim 16, wherein a wavefront deformation is determined by a local displacement of the lens spot.

19. The microscope according to claim 16, wherein calibration measurement of the position of the lens spot is performed without influencing the sample, via a flat mirror in the sample plane.

20. The microscope according to claim 1, wherein wavefront deformations are determined by means of multiple images being captured and/or by means of detection of the illumination spot with the position of the detection being shifted in the direction of the optical axis.

21. The microscope according to claim 1, further comprising at least one beam splitter for splitting the detection light into at least two partial beam paths, in which one redistribution element is positioned in each partial beam path, the same having different path lengths with respect to each other.

22. The microscope according to claim 1, wherein, for the purpose of determining the wavefront and phase shift, images or illumination spots from different axial planes are compared to each other, the same being captured by a displacement of the sample and/or the detection device in the axial direction.

23. The microscope according to claim 1, further comprising a variable lens in the detection beam path and/or the shared illumination/detection beam path.

24. A method for high resolution scanning microscopy of a sample, comprising
illuminating said sample;
guiding at least one point or linear spot over the sample in a scanning manner so that it is imaged into a single image, wherein the spot is imaged into the single image, with an imaging scale, and diffraction-limited, and the single image is static in a detection plane;
detecting the single image for various scan positions with a location accuracy, such that a diffraction structure of the single image is detected;
evaluating the diffraction structure of the single image for each scan position, and generating an image of the sample which has a resolution which is enhanced beyond the diffraction limit;
a detector array being included which comprises the pixels and is larger than the single image;
radiation of the single image from the detection plane being redistributed on the pixels of the detector array in a non-imaging manner; and
detecting the amplitude and/or phase of a wavefront influenced by the sample with spatial resolution through means for the detection of said wavefront.

25. The method according to claim 24, wherein said radiation of the single image is redistributed by means of a bundle of multi-mode optical fibers, which has an input arranged in the detection plane, and an output where the optical fibers end at the pixels of the detector array in a geometric arrangement which differs from that of the input.

26. The method according to claim 25, wherein said optical fibers run from the input to the output in such a manner that optical fibers which are adjacent at the output are also adjacent at the input, in order to minimize a radiation intensity-dependent crosstalk between adjacent pixels.

27. The method according to claim 24, wherein said bundle of optical fibers and the detector array are calibrated, by each optical fiber individually receiving radiation, by interference signals in pixels which are associated with optical fibers which are adjacent thereto at the output being detected, and by a calibration matrix being established, by means of which a radiation intensity-dependent crosstalk between adjacent pixels is corrected in the subsequent microscopy of the sample.

28. The method according to claim 24, wherein said radiation of the single image is redistributed by means of a mirror with differently inclined mirror elements, wherein the radiation from the detection plane is directed by the mirror onto the pixels of the detector array, and whereby the pixels of the detector array have a geometric arrangement which differs from that of the mirror elements.

29. The method according to claim 28, wherein said mirror is a multifacet mirror.

30. The method according to claim 28, wherein said mirror is a DMD.

31. The method according to claim 28, wherein said mirror is an adaptive mirror.

32. The method according to claim 24, wherein said detector row is used as the detector array.

33. The method according to claim 32, wherein said detector row is an APD.

34. The method according to claim 32, wherein said detector row is a PMT row.

35. The method according to claim 24, further comprising determining a direction of movement of the scanning of the point or linear spot by signals of individual pixels of the detector array being evaluated by means of cross-correlation.

36. The method according to claim 24, further comprising detecting changes in the sample by means of determining and evaluating a chronological change in the diffraction-limited single image for the point or linear spot which is static in the sample.

37. The method according to claim 24, further comprising determining the influence of the sample on the phase by means of a wavefront sensor.

38. The method according to claim 37, wherein the wavefront sensor is a Shack-Hartmann sensor.

39. The method according to claim 37, wherein the wavefront sensor is a WIS sensor.

40. The method according to claim 37, wherein the wavefront sensor is a PAW wavefront sensor or a pyramid sensor.

41. The method according to claim 24, wherein the determination of the wavefront is performed using interferometric or holographic methods.

42. The method according to claim 24, wherein the determination of the wavefront is performed using a phase retrieval method.

43. The method according to claim 24, further comprising arranging a lens array in front of light input surfaces of the redistribution element, said lens array directing light from each lens, at least three, light input surfaces.

44. The method according to claim 43, further comprising determining the position of each lens spot by means of receivers which are functionally assigned to the light input surfaces via the intensity measurement of the light input surfaces to which light is directed.

45. The method according to claim 43, further comprising determining wavefront deformation by a local displacement of the lens spot.

46. The method according to claim 43, further comprising performing calibration measurement of the position of the lens spot without influencing the sample, via a flat mirror in the sample plane.

47. The method according to claim 24, further comprising determining wavefront deformations by means of multiple images being captured and/or by means of detection of the illumination spot with the position of the detection being shifted in the direction of the optical axis.

48. The method according to claim 24, further comprising splitting the detection light into at least two partial beam paths by means of at least one beam splitter, in which one redistribution element is positioned in each partial beam path, the same having different path lengths with respect to each other.

49. The method according to claim 24, further comprising comparing to each other images or illumination spots from different axial planes, the same being captured by a displacement of the sample and/or the detection device in the axial direction, for determining the wavefront and phase shift.

50. The method according to claim 34, further comprising providing a variable lens in the detection beam path and/or the shared illumination/detection beam path.

* * * * *